(12) United States Patent
Fowler et al.

(10) Patent No.: US 7,559,254 B2
(45) Date of Patent: Jul. 14, 2009

(54) SENSOR FOR SENSING DEFLECTION OF A TUBE IN TWO ORTHOGONAL PLANES

(75) Inventors: James Fowler, Woking (GB); Pei An, Woking (GB)

(73) Assignee: 2H Offshore Engineering Limited, Woking (GB)

( * ) Notice: Subject to any disclaimer, the term of this patent is extended or adjusted under 35 U.S.C. 154(b) by 5 days.

(21) Appl. No.: 11/691,128

(22) Filed: Mar. 26, 2007

(65) Prior Publication Data

US 2007/0240526 A1 Oct. 18, 2007

(30) Foreign Application Priority Data

Mar. 28, 2006 (GB) ................................. 0606121.2
Sep. 26, 2006 (GB) ................................. 0619034.2

(51) Int. Cl.
*G01N 3/20* (2006.01)
*G01M 5/00* (2006.01)
*G01B 5/20* (2006.01)

(52) U.S. Cl. .......................................... 73/849; 73/786

(58) Field of Classification Search ................... 73/786, 73/862.471, 849

See application file for complete search history.

(56) References Cited

U.S. PATENT DOCUMENTS

| 4,191,334 | A | * | 3/1980 | Bulanda et al. | ............ 24/16 PB |
| 4,738,140 | A | * | 4/1988 | Kempf | ........................ 73/730 |
| 5,065,631 | A | * | 11/1991 | Ashpitel et al. | ................ 73/849 |
| 5,337,613 | A | | 8/1994 | Kovari | |
| 5,712,424 | A | * | 1/1998 | Reed | ........................ 73/114.16 |
| 2005/0210961 | A1 | * | 9/2005 | De Aquino | .................... 73/49.5 |

FOREIGN PATENT DOCUMENTS

JP 63241409 A * 10/1988

* cited by examiner

*Primary Examiner*—Harshad Patel
*Assistant Examiner*—Punam Patel
(74) *Attorney, Agent, or Firm*—Burr & Brown (57) ABSTRACT

A sensor for sensing deflection/curvature of underwater riser pipes comprises a metal tube which is strapped to the pipe, with the tube being parallel to the length of the pipe. The tube is fitted internally with strain gauges which measure the deflection of the tube and thus of the pipe on which it is mounted. The tube is filled with oil and is connected to a plastics tube which can deform to recta to hydrostatic pressure at different water depths.

14 Claims, 8 Drawing Sheets

SENSOR FOR SENSING DEFLECTION OF A TUBE IN TWO ORTHOGONAL PLANES

FIELD OF THE INVENTION

This invention relates to a sensor for measuring the curvature and hence bending stresses in a dynamically loaded structure such as a deepwater riser. The invention is particularly (but not exclusively) intended for use underwater.

BACKGROUND OF THE INVENTION

Risers are long tubular structures assembled from steel pipe. In service they are subjected to high dynamic loads and since service lives in excess of 20 years are often required fatigue is an important design issue.

Monitoring the varying stresses in the riser is an important requirement to provide input to a planned integrity management program. Historically strain gauges have been used but their reliability in deep water has been poor due to water ingress and problems associated with reliable bonding of the gauges to the pipe wall which can often be hot and subject to corrosion.

SUMMARY OF THE INVENTION

According to the present invention, there is provided a sensor for sensing curvature of an elongate member, the sensor comprising a sealed hollow tube to be mounted on the surface of the elongate member with its axis parallel to that of the member, with strain gauges mounted within the tube to sense deflection of the tube in two orthogonal planes.

The hollow tube is preferably completely filled with a fluid which may be an oil. The tube should be rigid and may be of titanium or aluminium due to its low modulus of elasticity providing a low bending stiffness for the tube.

The sensor can be simply strapped to the outside diameter of the riser pipe and can accurately measure curvature and bending in the riser pipe in two orthogonal planes allowing the resultant bending magnitude and plane of bending to be determined.

The hollow tube is preferably connected to a tubular flexible walled section with the internal spaces of the tube and of the hollow walled sections being in fluid communication with one another. Electrical connections to the strain gauges can pass through the flexible walled section, with a connector being mounted at the end of the flexible walled section remote from the hollow tube, by means of which electrical signals from the strain gauges can be transmitted to external equipment. In the relaxed state, the flexible walled section can lie substantially coaxial with the hollow tube, at one end thereof. In use, the flexible walled section may be bent away from the tube axis, to allow for connection to other equipment.

Wires from the strain gauges are thus routed from one end of the tube via an oil filled flexible walled sheath to an electrical connector that allows connection of the instrument to either an umbilical or data logger. The oil filled sheath provides a 'bladder' reservoir to pressure balance the tube and prevent collapse at high depth.

The strain gauges preferably comprise two full bridges, the gauges of the first bridge being mounted diametrically opposite to one another and the gauges of the second bridge being mounted diametrically opposite one another and in a plane at right angles to the gauges of the first bridge. The gauges are preferably mounted at the mid point of the length of the hollow tube.

Tension bands can surround the elongate member and the tube to strap the tube to the riser being monitored. The straps can be steel or Kevlar (for example). The strapping is designed to ensure that the tube bends sympathetically with the riser pipe and thus ensures that the curvature in the tube and riser pipe are equivalent. The curvature in the riser will be quite small. Typically the curvature which occurs and which can be sensed by the instrument is of the order of a radius greater than 500 meters, and curvatures with a radius of 2 kilometres can be detected and measured.

Mounting of the tube to the pipe is dependent on the riser pipe coating. Typically a hard rubber saddle is used for stability, to reduce local stresses on the tube and provide electrical isolation. In the event that the riser pipe is coated with an insulation material then the tube can be mounted directly on the insulation or in a profile formed in the surface of the coating.

In one embodiment, the mounting means includes a plurality of modules fitted around the tube, one module being associated with each tension band. The tube can be held within one module against longitudinal movement relative to the module but with a limited freedom of movement relative to the other modules.

Each module may comprise a longitudinal passage for receiving the hollow tube, an O-ring within the passage to make contact both with the inner surface of the passage and the outer surface of the tube, seals at both ends of the passage, and means for filling the passage between the seals with a fluid. Filling the passage in the module protects the O-ring which provides a connection between the tube and the module.

Typically, there may be four modules arranged one at each end of the tube and two arranged close to one another, either side of the midpoint of the tube.

The invention also provides a method of monitoring deflection in an underwater riser, wherein a sealed hollow tube is mounted underwater on the surface of the riser with the axis of the tube parallel to that of the riser, with strain gauges mounted within the tube to sense deflection of the tube in two orthogonal planes.

BRIEF DESCRIPTION OF THE DRAWING FIGURES

The invention will now be further described, by way of example, with reference to the accompanying drawings, in which.

DETAILED DESCRIPTION OF EMBODIMENTS OF THE INVENTION

Figure 1:
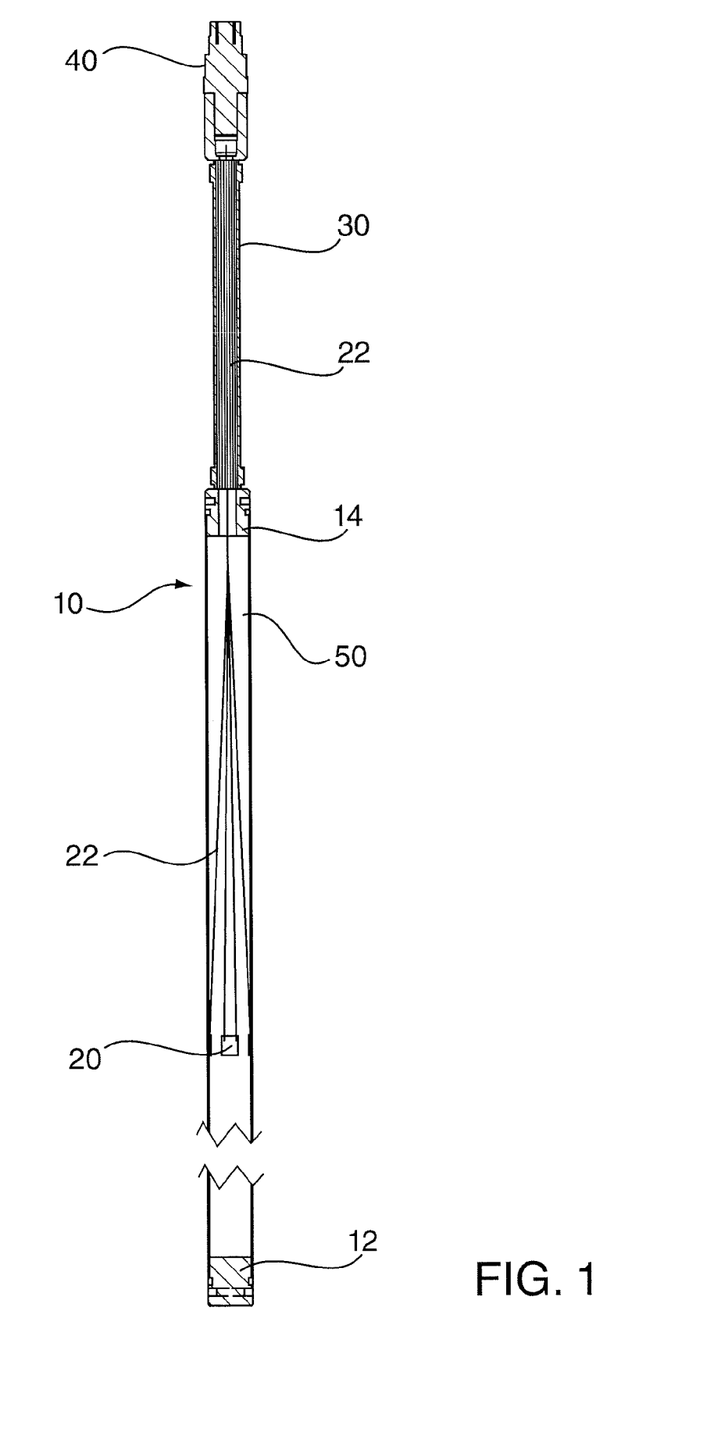
FIG. 1 is a cross-section through a sensor according to the invention.

FIG. 1 shows a thin walled titanium tube 10 that has been internally fitted with strain gauges with a full bridge allowing bending strain to be measured in two planes. The strain gauges 20 are located at the middle of the tube, and will be mounted in pairs, designated as EAST-WEST and NORTH-SOUTH (see FIG. 5). The E-W pairs (two E and two W gauges) will sense deflection in one plane and the N-S pairs (two N and two S gauges will sense deflection in a plane which is normal to the plane sensed by the E-W gauges. The gauges will each be connected in a full bridge circuit, and the outputs from the gauges will be indicative of the extent of curvature of the tube 10. The tube may typically be between 500 mm and 1000 mm long with a diameter of about 20 mm.

Titanium is selected as the preferred material due to its high flexibility, low modulus, high resistance to corrosion, linear strain characteristics and long term structural stability. GRP materials are typically not selected due to long term creep impacting the long term structural stability. It will be understood that the diameter of the tube, or the thickness of the tube wall, does not affect the operation of the present invention.

One end of the tube 10 is sealed with a plug 12 that is fitted with double O ring seals. The plug 12 is retained via a radial pin.

The opposite end of the tube is fitted with a sealed bush 14 similar to the plug 12. This bush has a concentric hole through which wires 22 connected to the strain gauges can be fed. The bush also has an external profile onto which a plastic tube 30 can be fitted.

On end of the plastic tube 30 is fitted over the end profile of the bush 14 and secured with a pipe clip and a heat shrink sleeve. The opposite end of the plastic tube is attached to a standard subsea electrical connection 40 through which connection can be made to the strain gauge wires 22 and thus to the gauges themselves.

The entire contents of the titanium and plastic tube are filled with a light biodegradable oil 50 before final sealing ensuring that no air bubbles exist. This is to ensure that the tube can be used at great depth without risk of hydrostatic collapse. Because the walls of the plastic tube 30 are flexible, they can deform under external hydrostatic pressure with the result that the internal hydrostatic pressure of the oil in the tube 10 substantially matches the external pressure, thus avoiding any danger of the walls of the tube collapsing.

The length of the plastic tube 30 will typically be of the same order as the length of the titanium tube 10.

Figure 2:
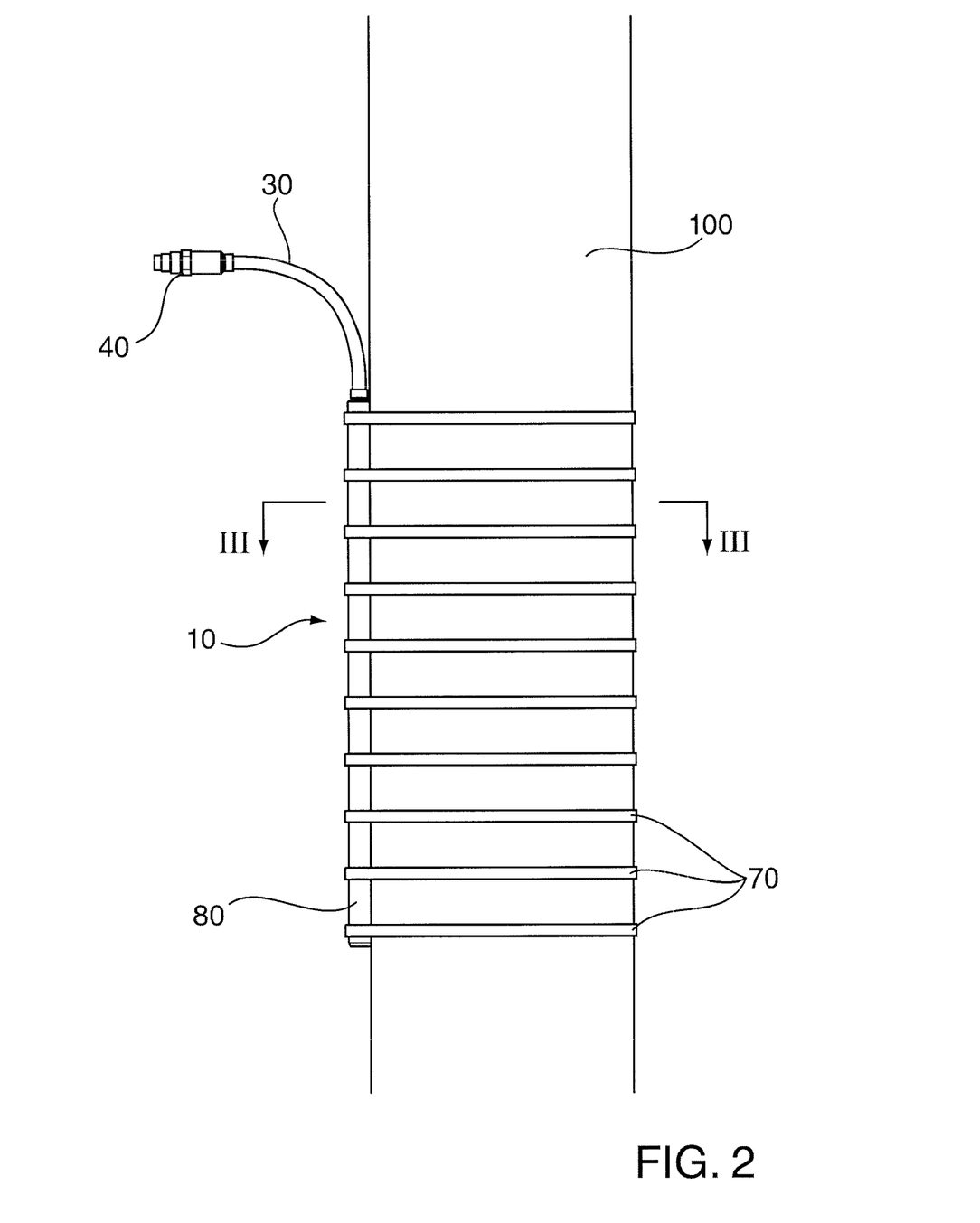
FIG. 2 is an elevation of the sensor of FIG. 1 strapped to a riser pipe.
Figure 3:
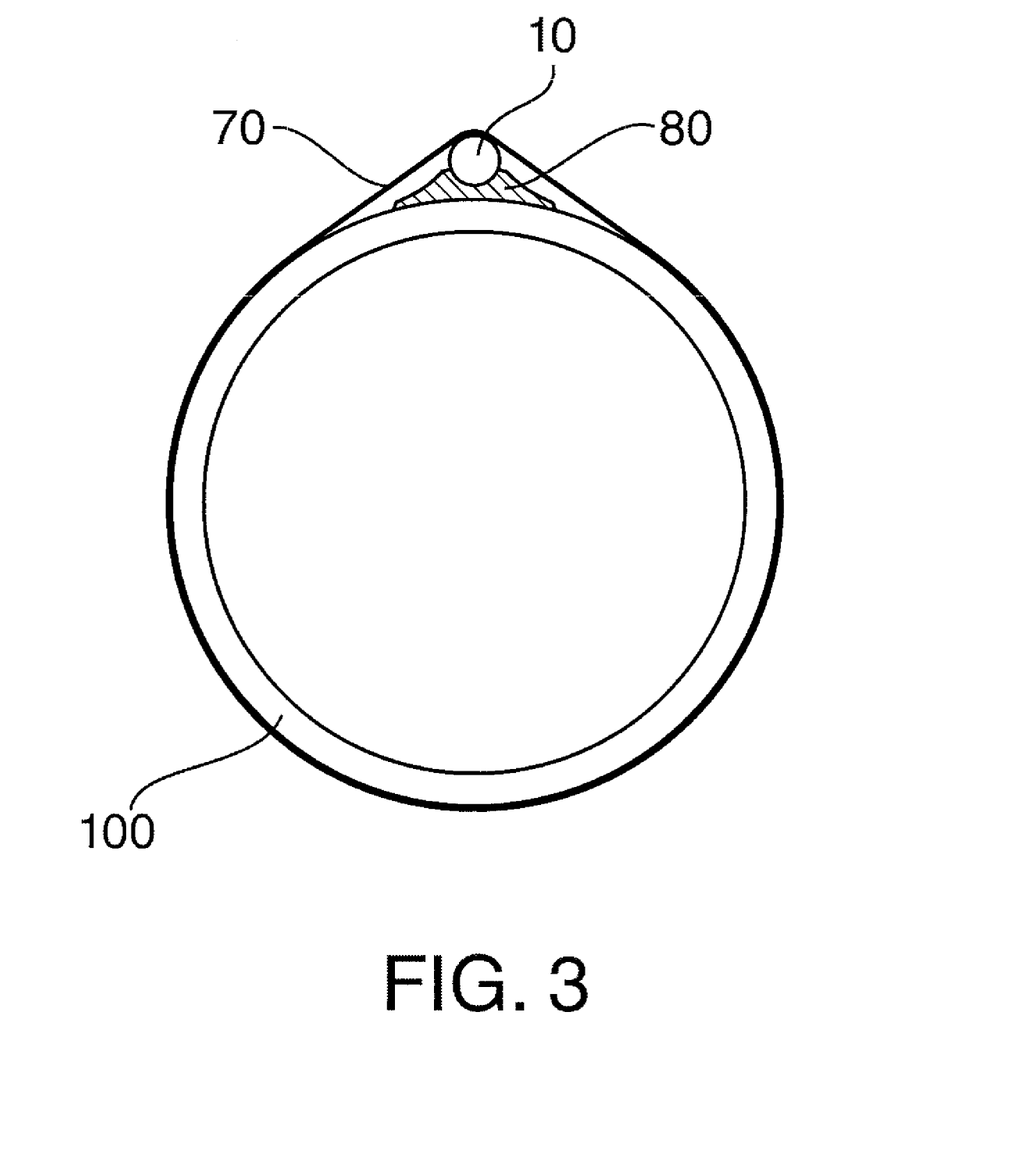
FIG. 3 is a section on the lines III-III from FIG. 2.

FIG. 2 shows the titanium tube 10 attached to a riser pipe 100 by a series of evenly spaced steel or Kevlar straps 70 and FIG. 3 shows a cross section of the tube 10 attached to a riser pipe 100 by the straps 70. The strapping force must be firm to ensure that the tube moves sympathetically with the deflection of riser pipe but must not be too high such that the tube is significantly deformed or even crushed.

This is assisted by use of a hard rubber saddle 80 interfaced between the tube and riser pipe that avoids a point load condition and also adds stability to the tube assisting attachment.

Details of the strapping is dependent on particular applications since some risers may have a range of different coatings for thermal and corrosion prevention purposes.

Figure 4:
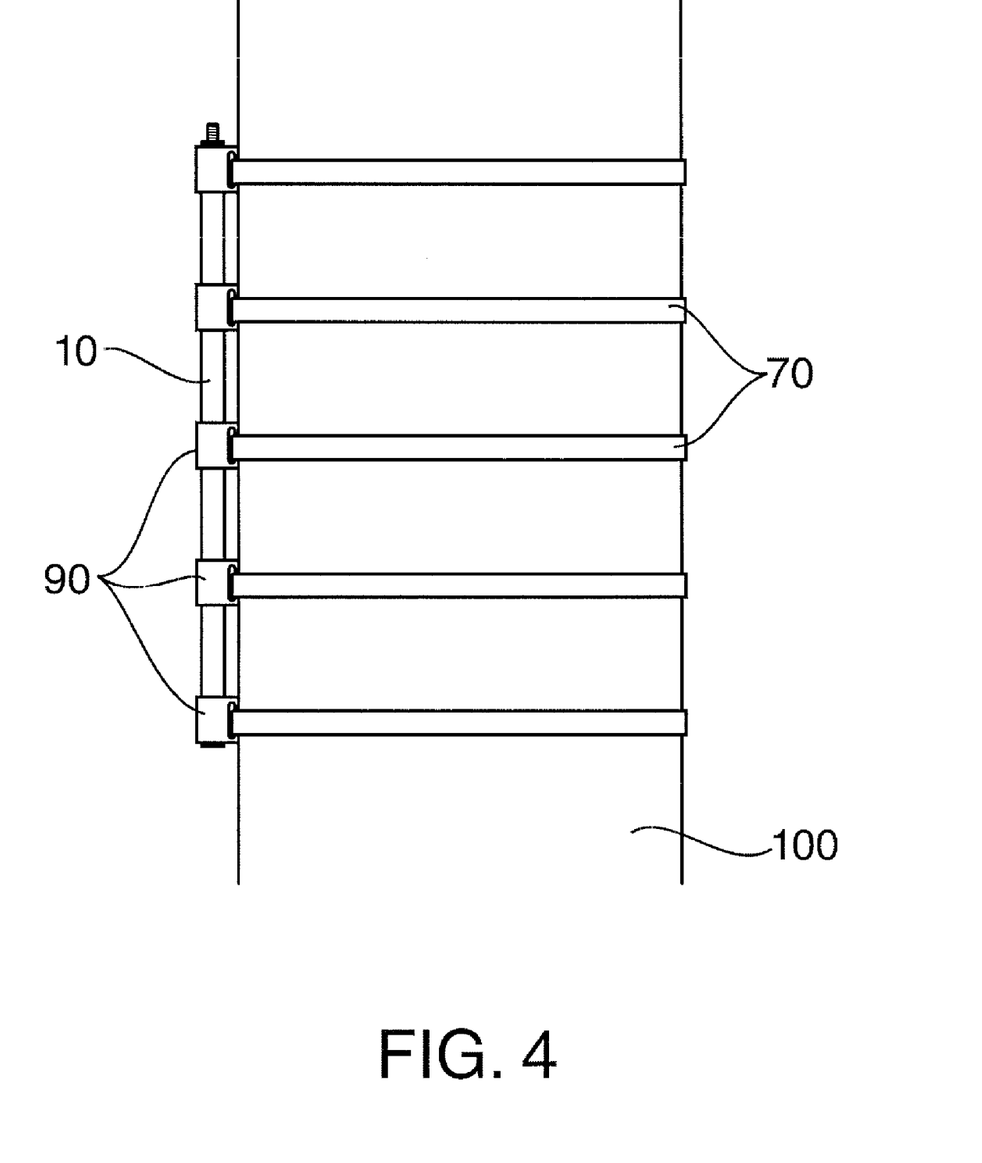
FIG. 4 is a view corresponding to FIG. 2 but showing an alternative embodiment.

FIG. 4 shows an alternative technique for attaching the tube to a riser pipe 100. In this embodiment, modules 90 are threaded onto the tube, and each of the modules is securely attached to the riser pipe using a strap 70. Using modules in this way avoids the strap from bearing directly against the tube surface and avoids any risk of crushing the tube 10.

Figure 5:
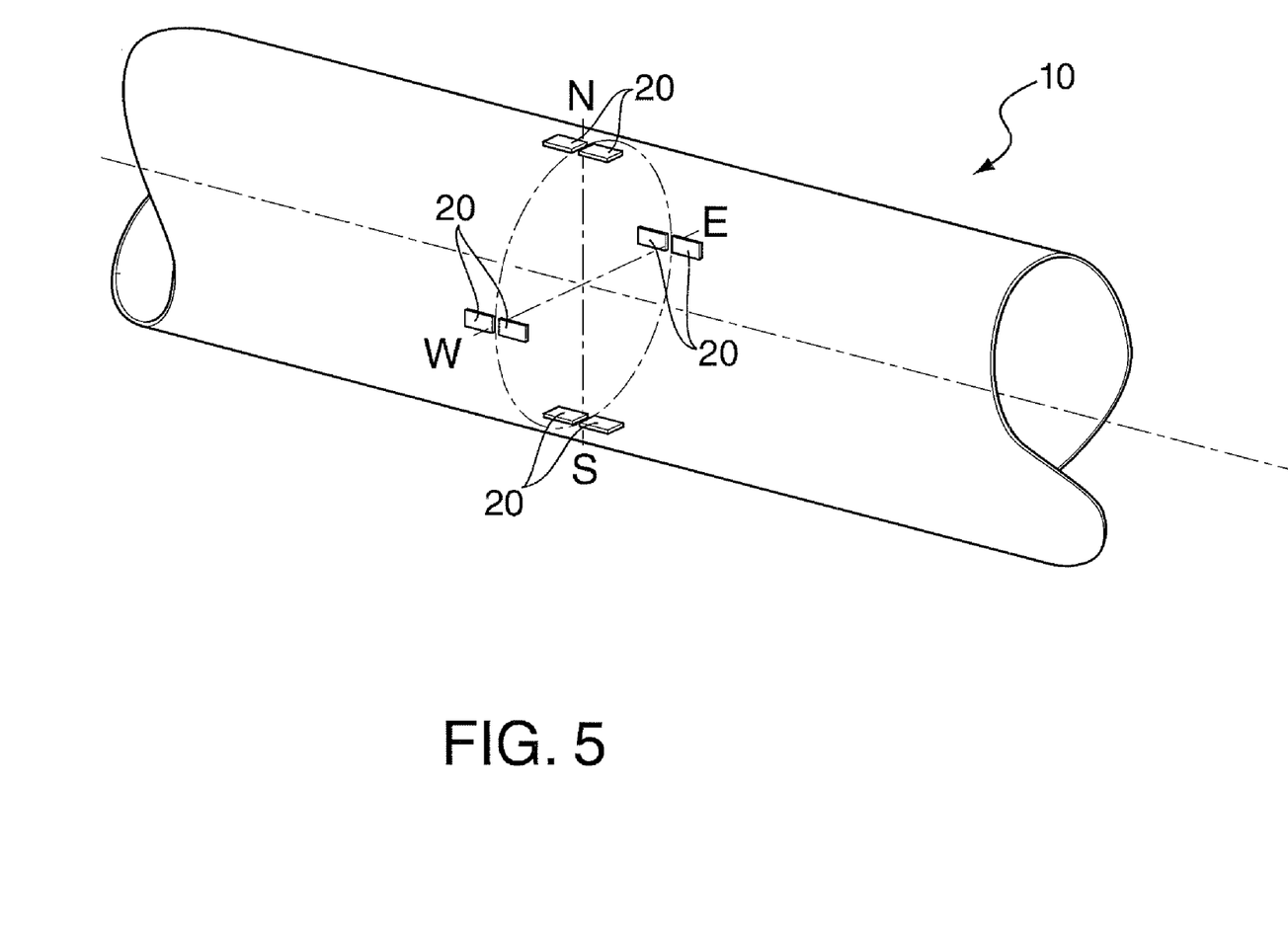
FIG. 5 illustrates the positioning of the strain gauges in the tube.

FIG. 5 shows a perspective view of the tube 10 received within a plurality of modules. The modules comprise two types: a first module 120 and a plurality of second modules 130. Each of the modules comprises a slot 122, 132 through which a strap can be passed to secure the tube to a riser pipe.

Figure 6:
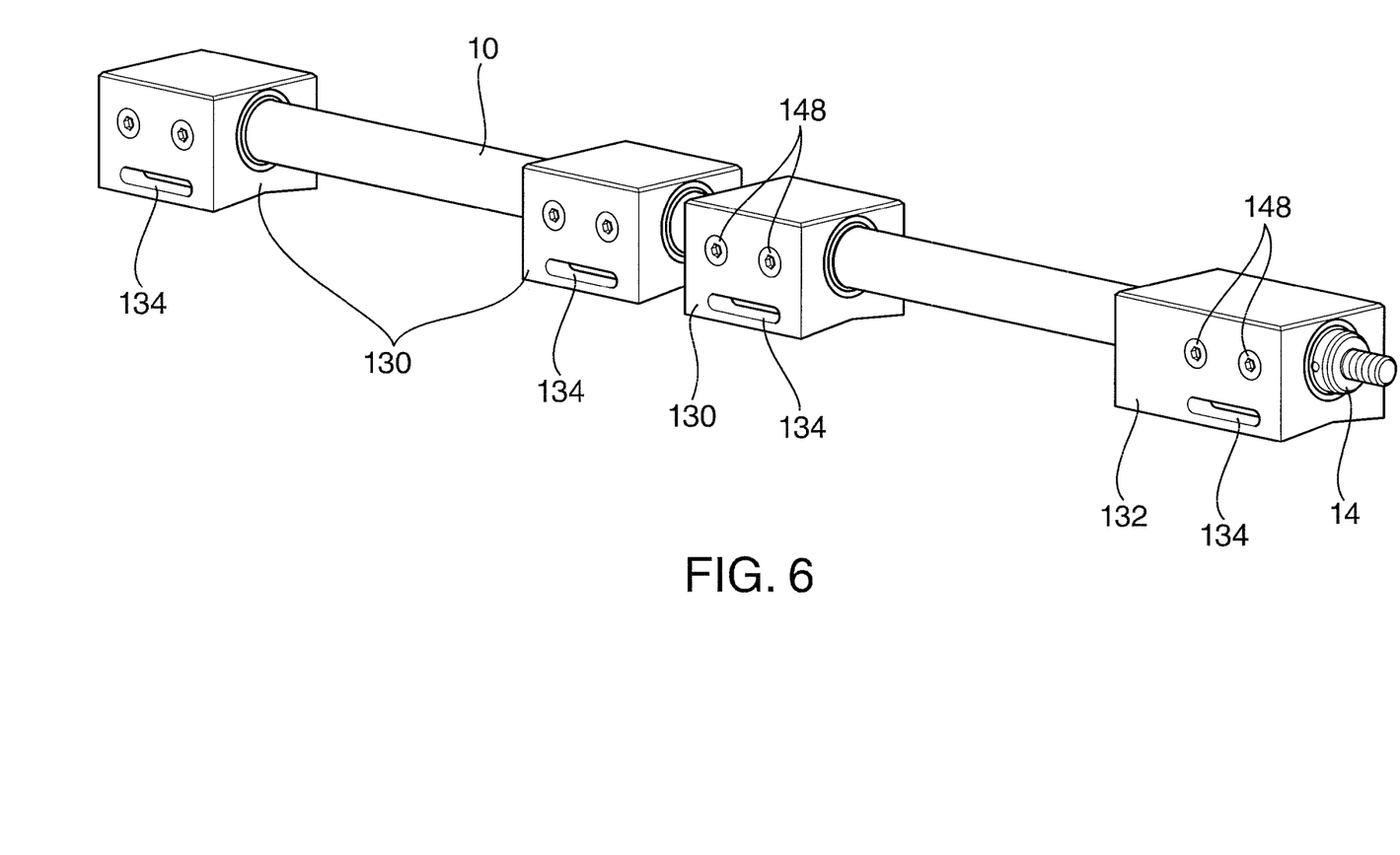
FIG. 6 is a perspective view of a tube with four associated mounting modules.

FIG. 6 shows a tube 10 with modules 130, 132 threaded onto the tube. The modules 130 are identical with each other, and the module 132 is different.

Each module has a slot 134 for receiving a strap 70 to secure the tube to a riser pipe. It will be seen from FIG. 6 that four modules are used in this embodiment. There is one module at each end, and two near the middle, on either side of the location of the strain gauges 20.

Figure 7:
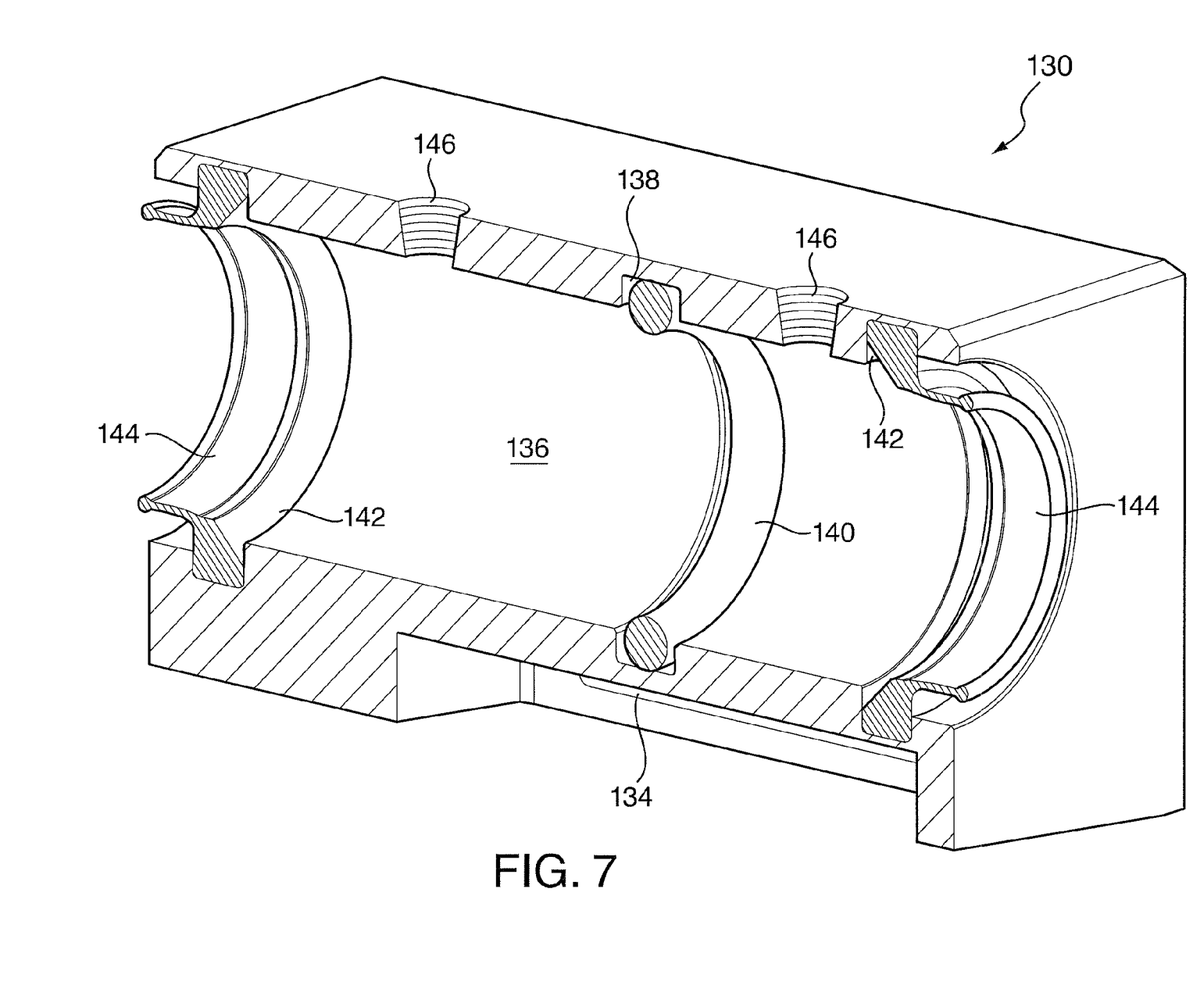
FIG. 7 is a section through one of the middle mounting modules from FIG. 6.

FIG. 7 shows a detail of one of the modules 130. The module is a single body which may be moulded from a plastics material or may be of metal. It has an internal passage 136 with a circumferential groove 138 which accommodates an O-ring 140. At each end of the passage 136 is a further circumferential groove 142 each of which accommodates an annular oil seal 144. In use, the module will be threaded onto the tube 10, with the O-ring 140 and the seals 144 making contact with the external surface of the tube. The passage 136 will then be filled with oil through filling holes 146, which will then be closed with suitable plugs 148 (FIG. 6).

The seals 144 are present to retain the oil. However the O-ring 140 has to transmit to the tube any bending movement of the riser pipe to which it is attached, and the material of the O-ring should be chosen with this in mind.

The O-ring 140, which is preferably a rubber, elastomeric or polymeric O-ring, prevents the tube from making contact with the body of the module 130 and allows the tube to move relative to the module.

Figure 8:
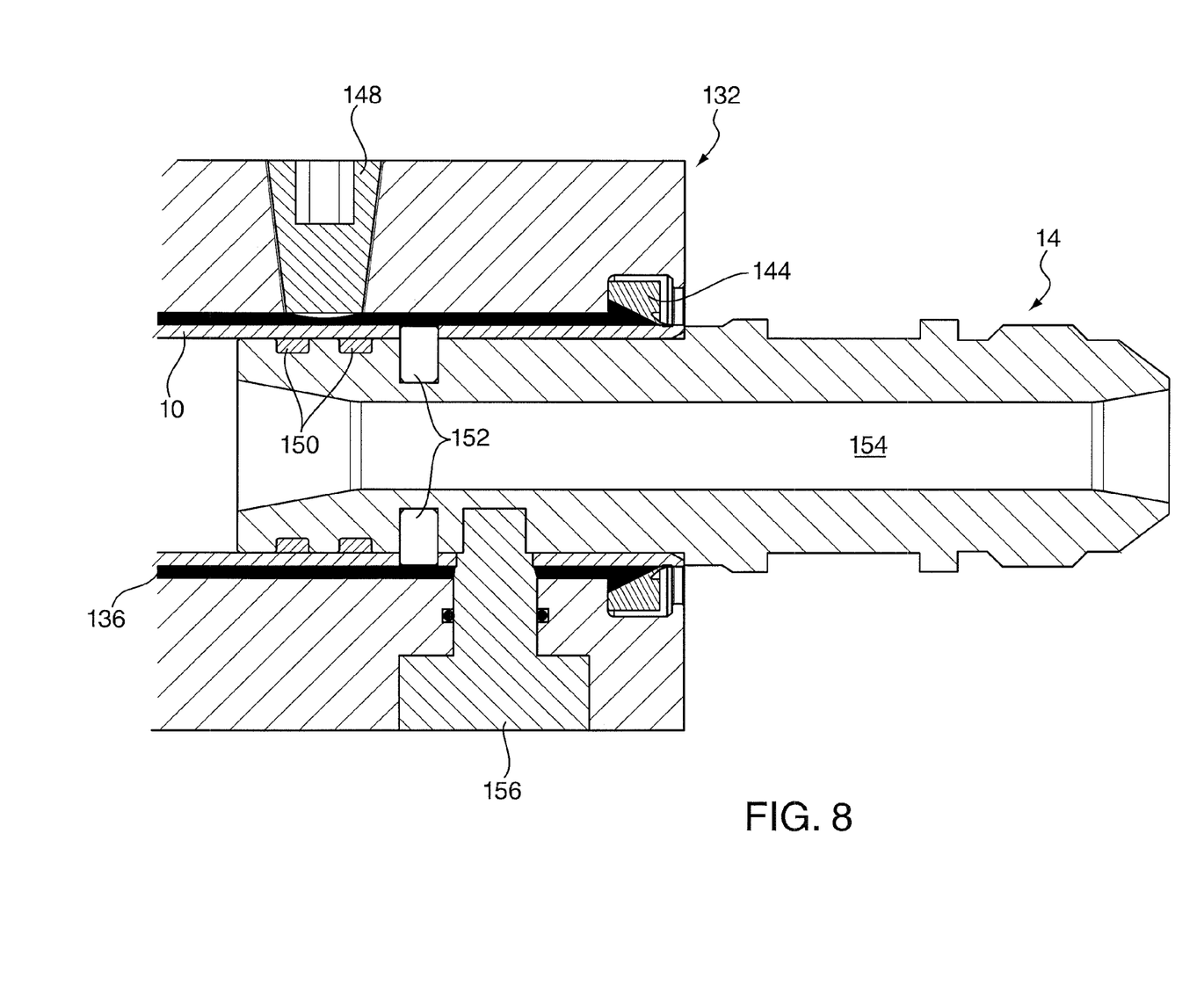
FIG. 8 is a section through the right hand end mounting module from FIG. 6.

The right hand end of the module 132 is shown in FIG. 8. In this figure, the tube 10 is present in the module, and the passage 136 is filled with oil (indicated by a solid filling in this passage). This figure also shows the bush 14 fitted into the end of the tube 10 and sealed in the tube by seals 150. A mechanical locating element (such as a circlip) at 152 holds the bush in the tube. The projecting part of the bush is adapted to have a plastic tube 30 pushed over it, where the tube can be clamped by a suitable tube clamp (not shown). The bush has a central bore 154. An anti-rotation pin 156 extends radially from the outer surface of the module, through the wall of the tube 10 and into the bush 14, to secure the tube against rotation in the module. O-ring seals 158 prevent leakage of oil from the passage 136 past the pin 156. If necessary, more than one anti-rotation pin may be fitted, in only one of the modules, or in some or all of them.

An O-ring corresponding to O-ring 140 from FIG. 7 will also be fitted in module 132, although not shown in FIG. 8. However the O-ring in module 134 may be of a different composition compared to the rings in modules, to provide a greater degree of restraint to the tube relative to the module.

Although FIG. 6 shows that the tube is held by one of the first modules and three of the second modules, it will be readily understood that different numbers of the first and/or the second modules may be used. Although FIG. 6 shows that the module 132 (i.e., the module in which the tube is held most precisely), is at the end where the strain gauge wires exit and the tube 30 is attached, it will be understood that this module may be located at any position along the tube relative to the remaining modules.

When the riser pipe bends, the tube 10 is held securely by the first module 132 but is free to shear relative to the second modules 130.

The sensor described thus consists of a small diameter metallic tube that is internally strain gauged with a full bridge. The tube is fully sealed and oil filled providing a controlled environment for the electronics and gauges ensuring a long service life. The sensor will be required to operate at substantial water depths (e.g., 1 kilometre or more), and several sensors may be attached to a particular riser pipe, at different points along the pipe length.

The invention claimed is:

1. A sensor for sensing curvature of an elongate member, the sensor comprising a sealed hollow tube to be mounted on the surface of the elongate member with its axis parallel to that of the member, with strain gauges mounted within the tube to sense deflection of the tube in two orthogonal planes, the hollow tube being completely filled with oil.

2. A sensor as claimed in claim 1, wherein the tube is of titanium.

3. A sensor as claimed in claim 1, wherein the hollow tube is connected to a tubular flexible walled section in which an internal space of the hollow tube and of an internal space of the flexible walled section are in fluid communication with one another.

4. A sensor as claimed in claim 3, wherein electrical connections to the strain gauges pass through the flexible walled section, and a connector is mounted at the end of the flexible walled section remote from the hollow tube, by means of which electrical signals from the strain gauges can be transmitted to external equipment.

5. A sensor as claimed in claim 3, wherein, in the relaxed state, the flexible walled section lies substantially coaxial with the hollow tube, at one end thereof.

6. A sensor as claimed in claim 1, wherein the strain gauges comprise two full bridges, the gauges of the first bridge being mounted diametrically opposite to one another and the gauges of the second bridge being mounted diametrically opposite one another and in a plane at right angles to the gauges of the first bridge.

7. A sensor as claimed in claim 1, wherein the gauges are mounted at the mid point of the length of the hollow tube.

8. A sensor as claimed in claim 1, including means for mounting the tube on an external surface of the elongate member.

9. A sensor as claimed in claim 8, wherein the mounting means includes tension bands for surrounding the elongate member and the tube, and a saddle between the tube and the elongate member, to spread the loads at the interface between the tube and the elongate member.

10. A sensor as claimed in claim 8, wherein the mounting means includes tension bands for surrounding the elongate member, and a plurality of modules fitted around the tube, one module being associated with each tension band.

11. A sensor as claimed in claim 10, wherein the tube is held within one module against longitudinal movement relative to the module but has a limited freedom of movement relative to the other modules.

12. A sensor as claimed in claim 10, wherein the modules each comprise a longitudinal passage for receiving the hollow tube, an O-ring within the passage to make contact both with the inner surface of the passage and the outer surface of the tube, seals at both ends of the passage, and means for filling the passage between the seals with a fluid.

13. A sensor as claimed in claim 10, wherein there are four modules.

14. A sensor as claimed in claim 13, wherein two of the modules are arranged, one at each end of the tube and the other two modules are arranged close to one another, either side of the midpoint of the tube.

* * * * *